US009852613B2

(12) United States Patent
Viggedal et al.

(10) Patent No.: US 9,852,613 B2
(45) Date of Patent: Dec. 26, 2017

(54) METHOD AND MONITORING CENTRE FOR MONITORING OCCURRENCE OF AN EVENT

(71) Applicant: Telefonaktiebolaget LM Ericsson (publ), Stockholm (SE)

(72) Inventors: Anna Viggedal, Stockholm (SE); Joakim Formo, Åkersberga (SE); Marcus Nyberg, Hägersten (SE); Mikael Anneroth, Enebyberg (SE); Vlasios Tsiatsis, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 100 days.

(21) Appl. No.: 14/916,409

(22) PCT Filed: Sep. 10, 2013

(86) PCT No.: PCT/SE2013/051050
§ 371 (c)(1),
(2) Date: Mar. 3, 2016

(87) PCT Pub. No.: WO2015/038039
PCT Pub. Date: Mar. 19, 2015

(65) Prior Publication Data
US 2016/0196738 A1    Jul. 7, 2016

(51) Int. Cl.
*G08B 29/00* (2006.01)
*G08B 29/18* (2006.01)
(Continued)

(52) U.S. Cl.
CPC ............ *G08B 29/188* (2013.01); *G08B 5/22* (2013.01); *G08B 13/19689* (2013.01);
(Continued)

(58) Field of Classification Search
CPC .. G08B 29/188; G08B 5/22; G08B 13/19689; G08B 25/002; G08B 13/19691; G08B 13/196; H04L 67/12
(Continued)

(56) References Cited

U.S. PATENT DOCUMENTS 5,278,643 A    1/1994  Takemoto et al.
6,970,183 B1  11/2005  Monroe
(Continued)

FOREIGN PATENT DOCUMENTS

EP    1 341 382 A2    9/2003
GB    2329542 A       3/1999
(Continued)

OTHER PUBLICATIONS

Communication with Supplementary European Search Report, EP Application No. 13893524.2, dated Aug. 10, 2016.
(Continued)

*Primary Examiner* — Jack K Wang
(74) *Attorney, Agent, or Firm* — Sage Patent Group (57) ABSTRACT

A method and monitoring center for monitoring occurrence of events in a monitored area, where a monitoring equipment displays information that reflects sensor data reported from sensors in the monitored area. When the monitoring center detects an abnormal event, it identifies a set of sensors which are potentially impacted by the event, and triggers the sensors to enter a vigilance state of elevated operation and to deliver enhanced sensor data. Further, a representation of the abnormal event is auto-zoomed on the monitoring equipment based on the enhanced sensor data from the sensors to increase resolution of the displayed representation.

16 Claims, 3 Drawing Sheets

(51) Int. Cl.
  G08B 25/00 (2006.01)
  G08B 5/22 (2006.01)
  H04L 29/08 (2006.01)
  G08B 13/00 (2006.01)
  H04N 7/18 (2006.01)
  G06K 9/00 (2006.01)
  G08B 13/196 (2006.01)

(52) U.S. Cl.
  CPC ..... G08B 13/19691 (2013.01); G08B 25/002 (2013.01); H04L 67/12 (2013.01); G08B 13/196 (2013.01)

(58) Field of Classification Search
  USPC .................................. 340/506, 552; 348/143
  See application file for complete search history.

(56) References Cited

U.S. PATENT DOCUMENTS

| | | | |
|---|---|---|---|
| 7,142,123 B1 | 11/2006 | Kates | |
| 8,274,524 B1* | 9/2012 | Cornell | G08G 1/0969 345/428 |
| 2004/0024851 A1* | 2/2004 | Naidoo | G08B 13/19669 709/219 |
| 2007/0008123 A1 | 1/2007 | Swanson | |
| 2008/0303903 A1* | 12/2008 | Bentley | G08B 13/19606 348/143 |
| 2008/0316025 A1* | 12/2008 | Cobbinah | A61B 5/1113 340/552 |
| 2009/0010493 A1 | 1/2009 | Gornick et al. | |
| 2012/0176496 A1* | 7/2012 | Carbonell | H04N 7/188 348/143 |
| 2013/0030875 A1* | 1/2013 | Lee | G06Q 10/06311 705/7.38 |

FOREIGN PATENT DOCUMENTS

| | | |
|---|---|---|
| GB | 2471784 A | 1/2011 |
| WO | WO 2006/010211 A1 | 2/2006 |
| WO | WO 2006/071259 A2 | 7/2006 |
| WO | WO 2006/071259 A3 | 7/2006 |
| WO | WO 2007/078475 A2 | 7/2007 |
| WO | WO 2007/078475 A3 | 7/2007 |

OTHER PUBLICATIONS

International Search Report, Application No. PCT/SE2013/051050, dated May 27, 2014.
Written Opinion of the International Searching Authority, Application No. PCT/SE2013/051050, dated May 27, 2014.

* cited by examiner

METHOD AND MONITORING CENTRE FOR MONITORING OCCURRENCE OF AN EVENT

CROSS REFERENCE TO RELATED APPLICATION

This application is a 35 U.S.C. §371 national stage application of PCT International Application No. PCT/SE2013/051050, filed on Sep. 10, 2013, the disclosure and content of which is incorporated by reference herein in its entirety. The above-referenced PCT International Application was published in the English language as International Publication No. WO 2015/038039 A1 on Mar. 19, 2015.

TECHNICAL FIELD

The present disclosure relates generally to a method and a monitoring centre, for monitoring occurrence of events in a monitored area wherein a monitoring equipment displays information that reflects sensor data from sensors distributed in different positions in the monitored area.

BACKGROUND

Equipment and procedures have been developed for monitoring various premises and areas that need to be supervised, where a plurality of sensors are installed at different locations within a monitored area. These sensors are configured to measure or observe some metric or parameter of interest, such as temperature, pressure, voltage, light, motion, sound, presence of objects, presence of smoke, and so forth. Some common examples of monitored "areas" that might need to be supervised include public areas such as city streets, public buildings, stadiums, public transportation, and also more proprietary areas such as private residences, land, vehicles, industrial premises, communication networks, etc. The sensors are connected through a communication network to a monitoring centre or the like and deliver information about measurements and observations to the monitoring centre, either at regular intervals or triggered by occurrence of an event, e.g. detection of motion, sound, light, temperature rise, etc.

It should be noted that a monitored area may be comprised of an infrastructure such as the above-mentioned examples of public transportation and communication networks. In the field of telecommunication, a monitoring centre called Network Operation Centre, NOC, is sometimes employed for supervision of a communication network based on sensor data reported by sensors located at different nodes and links across the communication network.

In this disclosure, information delivered from sensors will be referred to as "sensor data" which could be, without limitation, any information related to measurements and observations performed by the sensors, depending on their functionality. Further, the term "monitoring centre" will be used to represent a functional entity or node which receives sensor data from multiple sensors in a monitored area and displays information that reflects the sensor data on one or more monitoring screens that can be watched by humans.

Figure 1:
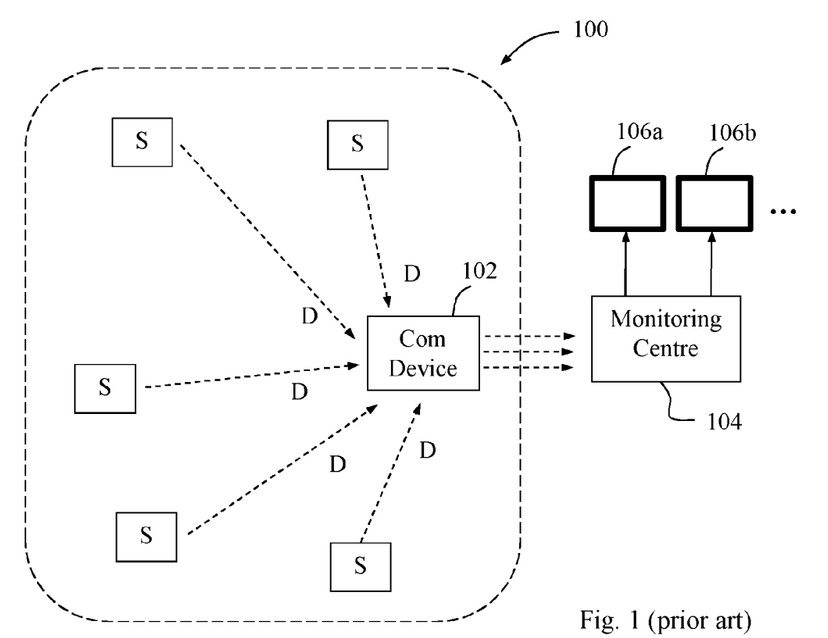
FIG. 1 is a communication scenario illustrating that sensor data is supplied to a monitoring centre, according to the prior art.

An example of how such an arrangement for supervision may be realized in practice is illustrated in FIG. 1 where a plurality of sensor nodes "S" are distributed to different positions within a schematically shown monitored area 100 and being configured to perform various measurements and observations at their positions and to deliver resulting sensor data "D", e.g. via a suitable communication device 102, to a monitoring centre 104 over a communication network, not shown. In this context, a sensor node may host one or more sensor functions, e.g. for measuring or observing temperature, light, sound, etc. The term "sensor" used in this disclosure thus represents a sensor node that hosts one or more sensor functions. Information that reflects the sensor data is displayed on one or more monitoring screens 106a, 106b . . . that can be watched by some staff present on-site. Such displayed information may include measurement results, a map image, an infrastructure image, any calculations or compilations made from received sensor data, and so forth.

When an event occurs in the area that might require some action to deal with the event, it is assumed that the staff watching the monitoring screens are able to draw their attention to the event for assessment and to decide what action(s) might be needed. Some examples of events that may be considered "abnormal" include fires, accidents, burglary, window breakage, equipment malfunction or failure. Before determining what actions need to be taken due to the event, it may be needed to evaluate the event in order to establish some vital facts such as the nature, location, extent, and potential consequences of the event.

In this disclosure, the term "abnormal event" is used to represent any event that potentially requires some action to be taken for dealing with the event, such as monitoring the event and any consequences thereof with increased attention. However, there are some problems associated with the above-described conventional arrangement for supervision. Firstly, the abnormal event may go unnoticed by the staff for a long time, particularly when there is a great amount of information being constantly displayed on the monitoring screens. Secondly, whenever an abnormal event occurs, the displayed information may not be sufficient or accurate as a basis for properly evaluating and assessing the event and any consequences thereof.

SUMMARY

It is an object of embodiments described herein to address at least some of the problems and issues outlined above. It is possible to achieve this object and others by using a method and a notifying unit as defined in the attached independent claims.

According to one aspect, a method is performed by a monitoring centre for monitoring occurrence of events in a monitored area. It is assumed that a monitoring equipment displays information that reflects sensor data from sensors distributed in different positions in the monitored area. In this method, the monitoring centre detects an abnormal event in the monitored area based on received sensor data, and identifies a set of sensors that are potentially impacted by the detected abnormal event. The monitoring centre then triggers the set of sensors to enter a vigilance state of elevated operation and to deliver enhanced sensor data. Further, the monitoring centre auto-zooms a representation of the abnormal event being displayed by the monitoring equipment based on the enhanced sensor data from the set of sensors, in a manner such that resolution of the displayed representation is increased.

According to another aspect, a monitoring centre is arranged to monitor occurrence of events in a monitored, wherein a monitoring equipment displays information that reflects sensor data from sensors distributed in different positions in the monitored area. The monitoring centre comprises a data collector that is configured to collect sensor data reported by the sensors. The monitoring centre further comprises a logic unit that is configured to detect an abnormal event in the monitored area based on received sensor data, and to identify a set of sensors potentially impacted by the detected abnormal event.

The monitoring centre also comprises a triggering unit configured to trigger the set of sensors to enter a vigilance state of elevated operation and to deliver enhanced sensor data. The monitoring centre also comprises a display controller that is configured to auto-zoom a representation of the abnormal event being displayed by the monitoring equipment based on the enhanced sensor data from the set of sensors, such that resolution of the displayed representation is increased.

The above method and monitoring centre may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is presented where a monitoring centre is configured to operate such that any human watching displayed information that reflects sensor data on some monitoring equipment, e.g. comprising one or more monitoring screens, is able to notice and discover an abnormal event with greater detail and accuracy. In this solution, it has been recognized that additional sensor data, apart from what is reported during normal conditions, may often be useful or even required to enable accurate analysis and evaluation of the abnormal event and its circumstances once it occurs.

A monitoring centre according to embodiments described herein is arranged to operate such that when an abnormal event is detected by the monitoring centre based on reported sensor data, a limited set of sensors are identified which are deemed to be, at least potentially, impacted by the detected abnormal event. The monitoring centre then triggers the identified sensors to enter a vigilance state of elevated operation and to deliver enhanced sensor data. A representation of the abnormal event being displayed by the monitoring equipment is then auto-zoomed such that resolution of the displayed representation is increased based on the enhanced sensor data. In this way, it will be easier for personnel that at least occasionally watch the monitoring equipment firstly to take notice of the displayed representation reflecting the abnormal event, and secondly to analyze and evaluate the abnormal event and its circumstances with enhanced accuracy and reliability.

An example of how a monitoring centre may operate to monitor occurrence of events in a monitored area according to some possible embodiments, will now be described with reference to the flow chart in FIG. 2. It is assumed that a monitoring equipment displays information that reflects sensor data delivered to the monitoring centre from sensors distributed in different positions in the monitored area. The monitoring equipment may comprise, without limitation, one or more monitoring screens or panels that can be watched by any supervising personnel, e.g. in a similar arrangement as illustrated in FIG. 1. The procedure in FIG. 2 may be implemented by means of various functional units or entities in the monitoring centre which will be outlined in more detail later below in some possible examples.

It is also assumed that the sensors across the monitored area, or at least some of them, more or less continuously perform various measurements and observations according to their functionalities, and report resulting sensor data to the monitoring centre over a communication network, either regularly or depending on their measurements and/or observations. A first action 200 illustrates that the monitoring centre receives reported sensor data over the communication network, which may go on constantly in the background throughout the described procedure. The reported sensor data may be collected in a suitable data storage or the like which then may be accessed in order to analyze the sensor data.

The sensors may thus report such sensor data to the monitoring centre on a regular basis or when triggered by a measurement or observation, e.g. when the sensor registers a certain condition such as a temperature rise, a motion, a sound, etc., depending on functionality. It is further assumed that the monitoring centre has a logic functionality that more or less continuously analyzes the reported sensor data in order to detect abnormal events as indicated by the sensor data. There may be some sensors that are "sleeping" i.e. not continuously measuring and reporting but being ready to be activated to start measuring and reporting upon receiving a suitable instruction or activation signal either from the monitoring centre or from a neighboring sensor, which will be described further below.

In a next shown action 202, the monitoring centre detects an abnormal event in the monitored area based on received sensor data. As indicated above, an abnormal event is generally deemed to have occurred when one or more of the sensors reports a measurement or observation that in some way deviates from normal and expected measurements or observations and which may require some action. To mention a few illustrative but non-limiting examples, an abnormal event may be indicated by a temperature rise, a detected motion, breakage of a window, a sound out of the ordinary. For example, when analyzing the reported sensor data, the monitoring centre may compare it with various predefined thresholds and when a reported measurements exceeds, or falls below, a corresponding threshold, an abnormal event can be assumed to have occurred.

A logic function or the like in the monitoring centre may be operable to analyze reported sensor data in order to detect when an abnormal event occurs. In a possible embodiment, this analysis may be further based on knowledge of previously occurred abnormal events which may have been stored in a knowledge database or the like at the monitoring centre. In other words, the abnormal event may be detected based on historical data that has been stored over time and reflecting previous abnormal events.

Having detected an abnormal event, the monitoring centre then identifies a set of sensors that are at least potentially impacted by the detected event, as shown in a next action 204. This set of potentially impacted sensors may naturally include a first sensor that has reported a measurement or observation deviating from what is normal, which has actually triggered detection of the abnormal event in the foregoing action 202, although this set of sensors may also include further sensors which are deemed to be potentially impacted, e.g., by being located nearby around the first sensor.

For example, if a first sensor reports an abnormally high temperature or presence of smoke suggesting a fire, further sensors located close to the first sensor may be included in the set of potentially impacted sensors as they may possibly start to report abnormally high temperatures as well in case intensity and/or magnitude of the fire increases. A logic function in the monitoring centre may operate to analyze reported sensor data and a topology showing how the sensors are placed, for identifying which sensors are potentially impacted and should be included in the set. This analysis may be further based on the above-mentioned historical data in the knowledge database.

In a further action 206, the monitoring centre triggers the set of sensors to enter a vigilance state of elevated operation and to deliver enhanced sensor data. This may be done by the monitoring centre sending a suitable instruction or triggering signal to each of the sensors in the set of potentially impacted sensors, indicating that the respective sensor should enter the vigilance state. An example of a protocol that may be used for sensor configuration, and thus for conveying the above instruction or triggering signal, is the IETF Constrained Application Protocol, CoAP, which is similar in concept to the Hypertext Transfer Protocol, HTTP, but tailored for constrained sensors and actuator devices such as ZigBee and Bluetooth sensors.

In this disclosure, the phrase "vigilance state of elevated operation" indicates that the sensors in some way increase their activity, either measuring/observing or reporting or both, such that the reported sensor data somehow becomes enhanced or improved as compared to the sensor data reported prior to entering the vigilance state. This enhancement or improvement of sensor data may involve increased accuracy or more frequent reporting, or enabling of a more accurate sleeping sensor on a multi-sensor device or any combinations thereof. An example of a message in CoAP enabled sensors that can be used for triggering more frequent reporting is to send the message "PUT request" to the sensor reporting frequency resource of the sensor. The body of the PUT request may in that case be a number representing the target frequency of the sensor which should be higher than the default frequency that the sensor is initialized with.

Some examples of how the set of sensors should operate when triggered to enter the vigilance state of elevated operation, will be briefly outlined below even though the solution is not limited to these examples. The set of sensors may be triggered to enter the vigilance state of elevated operation such that the sensors perform at least one of the following:

1) The sensors may be instructed or triggered to make measurements or observations more frequently, which means that they generally increase their level of sensing activity in order to provide more informative and/or more reliable sensor data to the monitoring centre. For example, a sensor may be configured to measure a parameter or the like with a certain "normal" rate when not in the vigilance state, and to measure that parameter with an increased rate thus higher than the normal rate when in the vigilance state.
2) The sensors may be instructed or triggered to report sensor data to the monitoring centre more frequently, which means that they will generally provide a greater amount of sensor data to the monitoring centre than prior to entering the vigilance state. This alternative could require more bandwidth in the communication network for reporting the sensor data.
3) The sensors may be instructed or triggered to increase accuracy of making measurements or observations, which means that they will produce a more detailed basis for reporting sensor data to the monitoring centre.
4) The sensors may be instructed or triggered to increase accuracy of reporting sensor data, which means that they will generally provide more detailed information to the monitoring centre. This alternative may again require more bandwidth in the communication network for reporting the sensor data.
5) The sensors may be instructed or triggered to activate further nearby sensors to also enter the vigilance state of elevated operation to expand the area from which measurements or observations are taken. In this way, a sensor may be configured to act as a "master" sensor over one or more "slave" sensors such that when the monitoring centre sends an instruction or triggering signal to the master sensor, this instruction or triggering signal will basically be propagated to the one or more slave sensors. Further, the instruction or triggering signal may be propagated after a certain delay such that enhanced or improved sensor data will first be reported from the master sensor and then after a while also from the slave sensor(s).
6) The sensors may be instructed or triggered to activate a sensor function that was previously sleeping. This is applicable for sensors having multiple sensor functions, which sensors were mentioned above, which means that they generally provide more accurate information that can be correlated with other sensor functions. This alternative may again require more bandwidth in the communication network for reporting the sensor data.

In another possible embodiment, at least one sensor of the set of sensors may be triggered to enter the vigilance state of elevated operation by starting to report measurement or observation data periodically to the monitoring centre, i.e. with a certain reporting rate. This may be useful in case the at least one sensor is normally in a "silent" state of measuring but not reporting and it is configured to report measurement or observation data only when triggered by a particular measurement or observation, such as when the sensor registers a certain condition, depending on functionality, as described above.

In yet another possible embodiment, at least one sensor of the set of sensors may be triggered to enter the vigilance state of elevated operation by changing from inactive to active. This may be useful in case the at least one sensor is normally in a "sleeping" state of inactivity when neither measuring nor reporting and it is configured to start measuring and reporting sensor data only when triggered to enter the vigilance state.

Returning to FIG. 2, another action 208 illustrates that the monitoring centre also auto-zooms a representation of the abnormal event being displayed by the monitoring equipment based on the enhanced sensor data from the set of sensors such that resolution of the displayed representation is increased. In this action, the displayed representation of the abnormal event is thus auto-zoomed on the monitoring equipment such that any personnel currently watching, at least occasionally, the monitoring equipment is able to take notice of the abnormal event and also to view the displayed representation with better accuracy and understanding thanks to the increased resolution. Some examples of how the displayed representation may be auto-zoomed will be briefly outlined below even though the solution is not limited to these examples.

Auto-zooming the displayed representation may comprise at least one of:

a) In case the displayed representation comprises a map image of an area of the abnormal event, that map image may be focused and/or enlarged on the monitoring equipment. Thereby, the map image can be viewed on the monitoring equipment with greater attention and accuracy.

b) In case the displayed representation comprises an infrastructure image of an area of the abnormal event, e.g. when the monitored area comprises a public transportation or a communication network, that infrastructure image may be focused and/or enlarged on the monitoring equipment. Thereby, the infrastructure image can be viewed on the monitoring equipment with greater attention and accuracy.

c) In case the displayed representation comprises a graph illustrating a compilation or the like of the enhanced sensor data, that graph may be focused and/or enlarged on the monitoring equipment. Thereby, the graph can be viewed on the monitoring equipment with greater attention and accuracy.

d) In case the displayed representation comprises measurement information, more detailed measurement information may be displayed on the monitoring equipment. Thereby, the measurement information can be viewed on the monitoring equipment with greater attention and accuracy.

e) In case the displayed representation comprises location information, more detailed location information may be displayed on the monitoring equipment. Thereby, the location information can be viewed on the monitoring equipment with greater attention and accuracy.

f) Another possible way of auto-zooming the displayed representation may be to display information about characteristics of the abnormal event, which may relate to the type or nature of the event, e.g. being a fire or some equipment malfunction or failure, as well as the extent and anticipated consequences of the event.

In another possible embodiment, the displayed representation may be auto-zoomed gradually over time such that the resolution of the displayed representation is increased in multiple steps. Thereby, more and more detailed information will be displayed over time, e.g. based on an increasing amount of sensor data being reported from the set of sensors after having entered the vigilance state. In further possible embodiments, the enhanced sensor data reported by the sensors when being in the vigilance state of elevated operation may be used as a basis for determining the nature, location, extent, and/or expected consequences of the abnormal event.

In yet another possible embodiment, the monitoring centre may activate at least one complementary mobile sensor to start delivering sensor data to the monitoring centre. For example, once the abnormal event has been detected, one or more such complementary mobile sensors may be directed to move towards an area being affected by the abnormal event, and to contribute by making measurements or observations and reporting sensor data to the monitoring centre.

Figure 3:
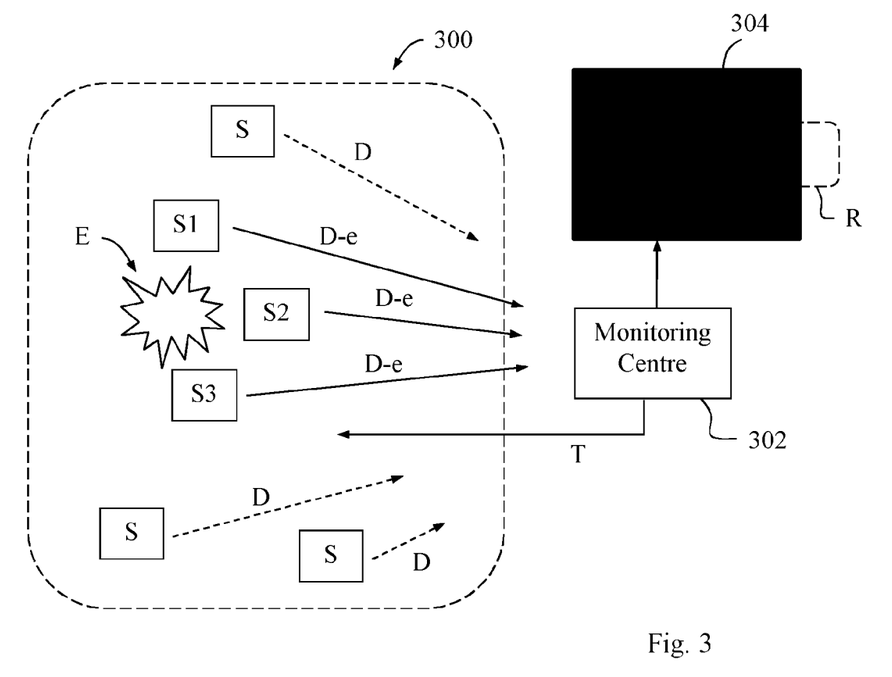
FIG. 3 is another communication scenario illustrating how a monitoring centre may be employed in practice, according to further possible embodiments.

FIG. 3 illustrates a scenario where the above-described procedure is employed. In this example, various sensors S have been distributed in different positions across a monitored area 300 and only a few of them are shown here for simplicity while in reality there may be hundreds or even thousands of sensors being used for monitoring the area 300. These sensors S send sensor data D more or less continuously to the monitoring centre, which is denoted 302 in this figure. Further, a monitoring equipment 304, e.g. a monitoring screen, displays information that reflects the sensor data D being reported by the sensors. Some examples of information that may be displayed in this context have been discussed above.

When the monitoring centre 302 detects an abnormal event E, e.g. as described for action 202 above, a set of sensors S1-S3 are identified as being potentially impacted by the event E, e.g. as described for action 204 above. The monitoring centre 302 then triggers the set of sensors S1-S3 to enter the vigilance state of elevated operation and to deliver enhanced sensor data "D-e" to the monitoring centre 302, e.g. as described for action 206 above. This may be done by sending a suitable instruction or trigger signal "T" form the monitoring centre 302 to the sensors S1-S3, as schematically shown in the figure.

The monitoring centre 302 further auto-zooms a representation R of the abnormal event being displayed by the monitoring equipment 304, based on the enhanced sensor data from the set of sensors S1-S3, such that resolution of the displayed representation R is increased, e.g. as described for action 208 above. The representation R being auto-zoomed on the monitoring equipment 304 may comprise any one or more of a map image, an infrastructure image, a graph, measurement information, location information, event characteristics, etc. although the solution is not limited to these examples.

Figure 4:
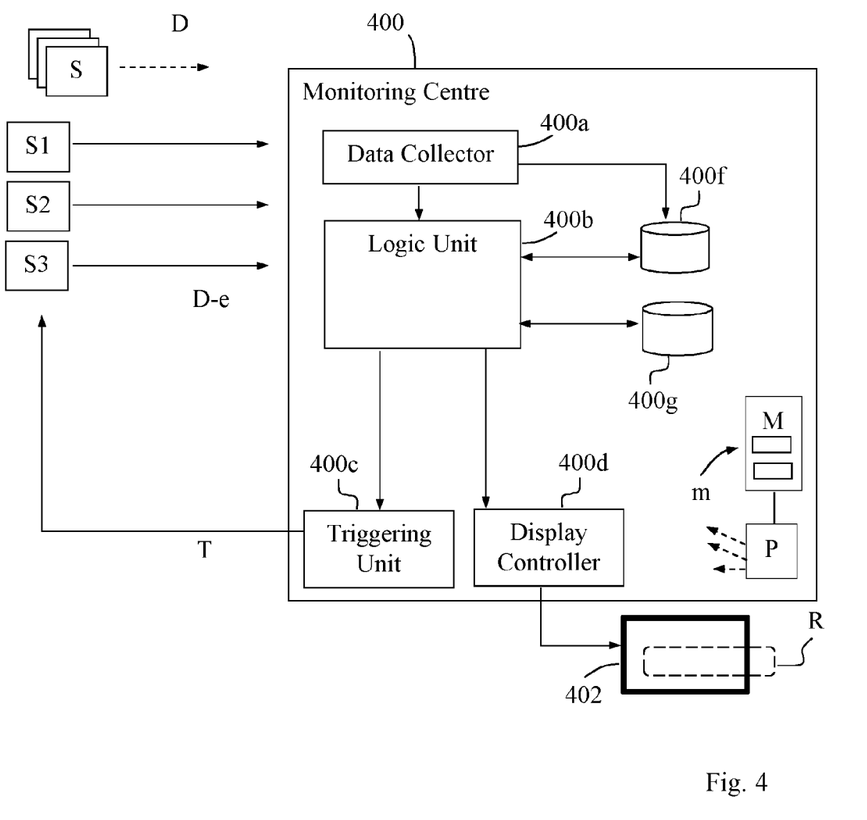
FIG. 4 is a block diagram illustrating a monitoring centre in more detail, according to further possible embodiments.

A detailed but non-limiting example of how a monitoring centre may be structured with some possible functional units to bring about the above-described operation of the monitoring centre, is illustrated by the block diagram in FIG. 4. In this figure, the monitoring centre 400 is arranged to monitor occurrence of events in a monitored area, not explicitly shown here, wherein a monitoring equipment 402 displays information that reflects sensor data D reported from sensors being distributed in different positions in the monitored area. The monitoring centre 400 may be configured to operate according to any of the examples and embodiments described above and as follows. The monitoring centre 400 will now be described in terms of some possible examples of employing the solution.

The monitoring centre 400 comprises a data collector 400a that is configured to collect sensor data D reported by the sensors S. The collect sensor data D may be stored in a data storage 400f. The monitoring centre 400 further comprises a logic unit 400b that is configured to detect an abnormal event in the monitored area based on received sensor data D, e.g. as described for action 202 above. The logic unit 400b is also configured to identify a set of sensors S1-S3 which are potentially impacted by the detected abnormal event, e.g. as described for action 204 above.

The monitoring centre 400 also comprises a triggering unit 400c that is configured to trigger the set of sensors S1-S3 to enter a vigilance state of elevated operation and to deliver enhanced sensor data D-e, e.g. as described for action 206 above. The monitoring centre 400 also comprises a display controller 400d that is configured to auto-zoom a representation R of the abnormal event being displayed by the monitoring equipment 402 based on the enhanced sensor data D-e delivered and reported from the set of sensors S1-S3, such that resolution of the displayed representation is increased, e.g. as described for action 208 above.

The above monitoring centre 400 and its functional units may be configured or adapted to operate according to various optional embodiments. In a possible embodiment, the triggering unit 400*c* may be configured to trigger the set of sensors S1-S3 to enter the vigilance state of elevated operation such that the sensors perform at least one of:

make measurements or observations more frequently,
  report sensor data to the monitoring centre more frequently,
  increase accuracy of making measurements or observations,
  increase accuracy of reporting sensor data,
  activate further nearby sensors to also enter the vigilance state of elevated operation to expand the area from which measurements or observations are taken, and
  activate a sensor function that was previously sleeping in a sensor with multiple sensor functions.

In another possible embodiment, the triggering unit 400*c* may be configured to trigger at least one sensor of the set of sensors S1-S3 to enter the vigilance state of elevated operation by starting to report measurement or observation data periodically to the monitoring centre. The triggering unit 400*c* may also be configured to trigger at least one of the sensors S1-S3 to enter the vigilance state of elevated operation by changing from inactive to active.

In further possible embodiments, auto-zooming the displayed representation may comprise at least one of:

focusing and/or enlarging a map image of an area of the abnormal event,
  focusing and/or enlarging an infrastructure image of the area of the abnormal event,
  focusing and/or enlarging a graph of the enhanced sensor data,
  displaying more detailed measurement information,
  displaying more detailed location information, and
  displaying information about characteristics of the abnormal event.

Another possibility in this solution is that the display controller 400*d* may be configured to auto-zoom the displayed representation gradually over time such that the resolution of the displayed representation is increased in multiple steps. The logic unit 400*b* may also be configured to detect the abnormal event based on historical data that has been stored over time, in a suitable storage 400*g*, and reflecting previous abnormal events. Further, the logic unit 400*b* may be configured to use the enhanced sensor data as a basis for determining the nature, location, extent, and/or expected consequences of the abnormal event. In another possible embodiment, the triggering unit 400*c* may be configured to activate at least one complementary mobile sensor to start delivering sensor data to the monitoring centre.

It should be noted that FIG. 4 illustrates some possible functional units in the monitoring centre 400 and the skilled person is able to implement these functional units in practice using suitable software and hardware. Thus, the solution is generally not limited to the shown structures of the monitoring centre 400, and the functional units 400*a*-*d* may be configured to operate according to any of the features and embodiments described in this disclosure, where appropriate.

Figure 2:
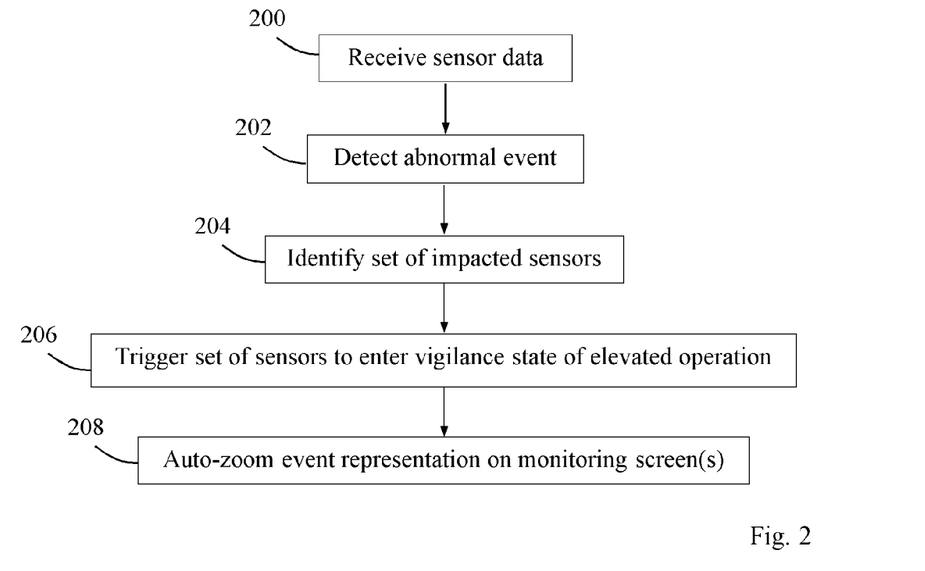
FIG. 2 is a flow chart illustrating a procedure in a monitoring centre, according to some possible embodiments.

The embodiments and features described herein may thus be implemented in a computer program comprising computer readable code which, when run on a monitoring centre, causes the monitoring centre to perform the above actions and functionality described in FIGS. 2-4. Further, the above-described embodiments may be implemented in a computer program product comprising a computer readable medium on which a computer program is stored. The computer program product may be a compact disc or other carrier suitable for holding the computer program. The computer program comprises computer readable code which, when run on a monitoring centre, causes the monitoring centre to perform the above actions and functionality. Some examples of how the computer program and computer program product can be realized in practice are outlined below.

The functional units 400*a*-*d* described above may be implemented in the monitoring centre 400 by means of program modules of a respective computer program comprising code means which, when run by a processor "P" causes the monitoring centre 400 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the monitoring centre 400 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the monitoring centre 400.

While the solution has been described with reference to specific exemplary embodiments, the description is generally only intended to illustrate the inventive concept and should not be taken as limiting the scope of the solution. For example, the terms "monitoring centre", "sensor", "vigilance state", "elevated operation", and "representation" have been used throughout this description, although any other corresponding entities, functions, and/or parameters could also be used having the features and characteristics described here. The solution is defined by the appended claims.

The invention claimed is:

1. A method performed by a monitoring centre for monitoring occurrence of events in a monitored area, wherein a monitoring equipment displays information that reflects sensor data from sensors distributed in different positions in the monitored area, the method comprising:
  detecting an abnormal event in the monitored area based on received sensor data,
  identifying a set of sensors potentially impacted by the detected abnormal event,
  triggering the set of sensors to enter a vigilance state of elevated operation and to deliver enhanced sensor data,
  auto-zooming a representation of the abnormal event being displayed by the monitoring equipment based on the enhanced sensor data from the set of sensors such that resolution of the displayed representation is increased, and
  wherein the displayed representation is auto-zoomed gradually over time such that the resolution of the displayed representation is increased in multiple steps.

2. The method according to claim 1, wherein the set of sensors are triggered to enter the vigilance state of elevated operation such that the sensors perform at least one of:

make measurements or observations more frequently,
report sensor data to the monitoring centre more frequently,
increase accuracy of making measurements or observations,
increase accuracy of reporting sensor data,
activate further nearby sensors to also enter the vigilance state of elevated operation to expand the area from which measurements or observations are taken, and
activate a sensor function that was previously sleeping in a sensor with multiple sensor functions.

3. The method according to claim 1, wherein at least one sensor of the set of sensors is triggered to enter the vigilance state of elevated operation by starting to report measurement or observation data periodically to the monitoring centre.

4. The method according to claim 1, wherein at least one sensor of the set of sensors is triggered to enter the vigilance state of elevated operation by changing from inactive to active.

5. The method according to claim 1, wherein auto-zooming the displayed representation comprises at least one of:
focusing and/or enlarging a map image of an area of the abnormal event,
focusing and/or enlarging an infrastructure image of the area of the abnormal event,
focusing and/or enlarging a graph of the enhanced sensor data,
displaying more detailed measurement information,
displaying more detailed location information, and
displaying information about characteristics of the abnormal event.

6. The method according to claim 1, wherein the abnormal event is detected based on historical data that has been stored over time and reflecting previous abnormal events.

7. The method according to claim 1, wherein the enhanced sensor data is used as a basis for determining the nature, location, extent, and/or expected consequences of the abnormal event.

8. The method according to claim 1, further comprising activating at least one complementary mobile sensor to start delivering sensor data to the monitoring centre.

9. A monitoring centre arranged to monitor occurrence of events in a monitored area, wherein a monitoring equipment displays information that reflects sensor data from sensors distributed in different positions in the monitored area, the monitoring centre comprising:
a data collector configured to collect sensor data reported by the sensors,
a logic unit configured to detect an abnormal event in the monitored area based on received sensor data, and to identify a set of sensors potentially impacted by the detected abnormal event,
a triggering unit configured to trigger the set of sensors to enter a vigilance state of elevated operation and to deliver enhanced sensor data,
a display controller configured to auto-zoom a representation of the abnormal event being displayed by the monitoring equipment based on the enhanced sensor data from the set of sensors such that resolution of the displayed representation is increased, and
wherein the display controller is configured to auto-zoom the displayed representation gradually over time such that the resolution of the displayed representation is increased in multiple steps.

10. The monitoring centre according to claim 9, wherein the triggering unit is configured to trigger the set of sensors to enter the vigilance state of elevated operation such that the sensors perform at least one of:
make measurements or observations more frequently,
report sensor data to the monitoring centre more frequently,
increase accuracy of making measurements or observations,
increase accuracy of reporting sensor data,
activate further nearby sensors to also enter the vigilance state of elevated operation to expand the area from which measurements or observations are taken, and
activate a sensor function that was previously sleeping in a sensor with multiple sensor functions.

11. The monitoring centre according to claim 9, wherein the triggering unit is configured to trigger at least one sensor of the set of sensors to enter the vigilance state of elevated operation by starting to report measurement or observation data periodically to the monitoring centre.

12. The monitoring centre according to claim 9, wherein the triggering unit is configured to trigger at least one sensor of the set of sensors to enter the vigilance state of elevated operation by changing from inactive to active.

13. The monitoring centre according to claim 9, wherein auto-zooming the displayed representation comprises at least one of:
focusing and/or enlarging a map image of an area of the abnormal event,
focusing and/or enlarging an infrastructure image of the area of the abnormal event,
focusing and/or enlarging a graph of the enhanced sensor data,
displaying more detailed measurement information,
displaying more detailed location information, and
displaying information about characteristics of the abnormal event.

14. The monitoring centre according to claim 9, wherein the logic unit is configured to detect the abnormal event based on historical data that has been stored over time and reflecting previous abnormal events.

15. The monitoring centre according to claim 9, wherein the logic unit is configured to use the enhanced sensor data as a basis for determining the nature, location, extent, and/or expected consequences of the abnormal event.

16. The monitoring centre according to claim 9, wherein the triggering unit is configured to activate at least one complementary mobile sensor to start delivering sensor data to the monitoring centre.

* * * * *